(12) United States Patent
Swoboda et al.

(10) Patent No.: US 7,463,653 B2
(45) Date of Patent: Dec. 9, 2008

(54) APPARATUS AND METHOD FOR COMPRESSION OF THE TIMING TRACE STREAM

(75) Inventors: Gary L. Swoboda, Sugar Land, TX (US); Bryan Thome, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 762 days.

(21) Appl. No.: 10/729,196

(22) Filed: Dec. 5, 2003

(65) Prior Publication Data

US 2004/0170169 A1 Sep. 2, 2004

Related U.S. Application Data

(60) Provisional application No. 60/434,176, filed on Dec. 17, 2002.

(51) Int. Cl.
*H04J 3/06* (2006.01)
*G01R 31/28* (2006.01)

(52) U.S. Cl. .......................................... 370/503; 714/45

(58) Field of Classification Search .................. 370/389, 370/465, 468, 503, 521, 535, 260, 354, 355, 370/357, 359, 518; 375/260, 354, 355, 357, 375/359; 714/45, 34
See application file for complete search history.

(56) References Cited

U.S. PATENT DOCUMENTS 5,920,572 A * 7/1999 Washington et al. ........ 370/535
6,615,371 B2 * 9/2003 McCullough et al. ......... 714/45
6,961,872 B2 * 11/2005 Yamamoto et al. ............ 714/34
6,985,848 B2 * 1/2006 Swoboda et al. .............. 703/26
7,003,699 B2 * 2/2006 Swaine et al. ................. 714/30
7,010,712 B1 * 3/2006 Huang et al. ................ 713/400
7,076,419 B2 * 7/2006 Swoboda ...................... 703/24
7,093,165 B2 * 8/2006 Kageshima .................. 714/34
7,318,176 B2 * 1/2008 Agarwala et al. ............. 714/45
7,325,169 B2 * 1/2008 Swoboda et al. ............. 714/45
2001/0034597 A1 * 10/2001 Swoboda et al. .............. 703/26
2002/0178403 A1 * 11/2002 Floyd et al. ................... 714/39
2003/0192034 A1 * 10/2003 Hayase ........................ 717/128
2004/0015879 A1 * 1/2004 Pauw et al. .................. 717/127
2004/0078690 A1 * 4/2004 Kohashi ....................... 714/38

\* cited by examiner

*Primary Examiner*—Kwang Bin Yao
*Assistant Examiner*—Candal Elpenord
(74) *Attorney, Agent, or Firm*—Wade James Brady, III; Frederick J. Telecky, Jr.

(57) ABSTRACT

In a test and debug system, a plurality of trace streams, including a timing trace stream, are transmitted from the target processing unit to the host processing unit for analysis. The timing trace stream, the trace stream that indicates activity or non-activity of the program counter each clock cycle, can occupy a large percentage of the bandwidth of the transmitted data. The transmitted data is organized into groups of packets, each packet having a control signal portion and a payload portion. Each information packet has a logic signal stored at each location indicating an activity or a non-activity of the program counter. By identifying portion of the timing trace stream wherein the activity or non-activity does not change for one or more groups of timing packets, the information in a plurality of packets can be represented by a header and an information packet that describes a number of packets in which the activity or non-activity of the program counter does not change.

7 Claims, 4 Drawing Sheets

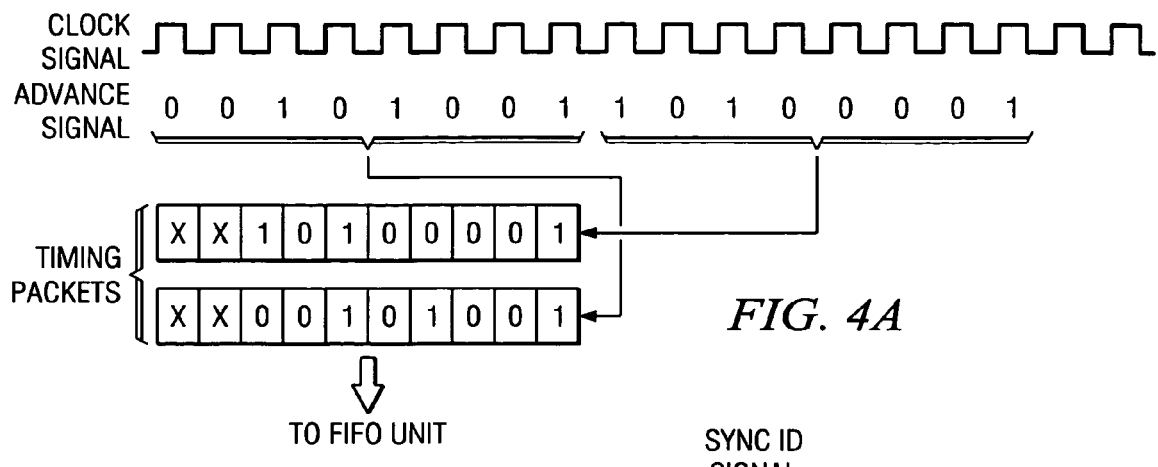
FIG. 4A
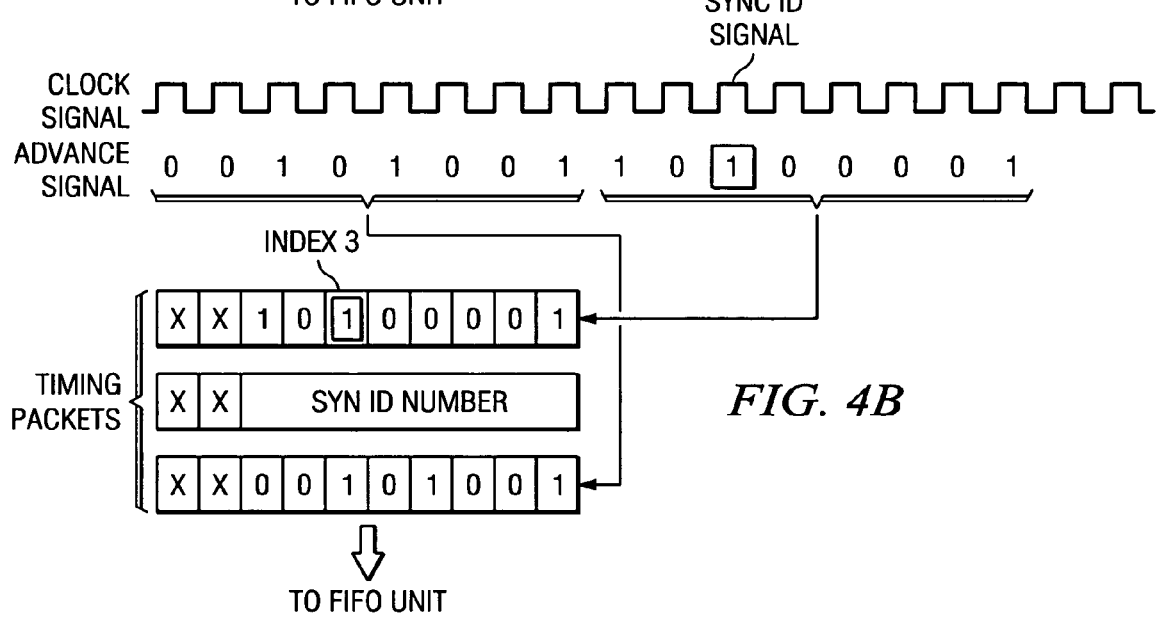
FIG. 4B
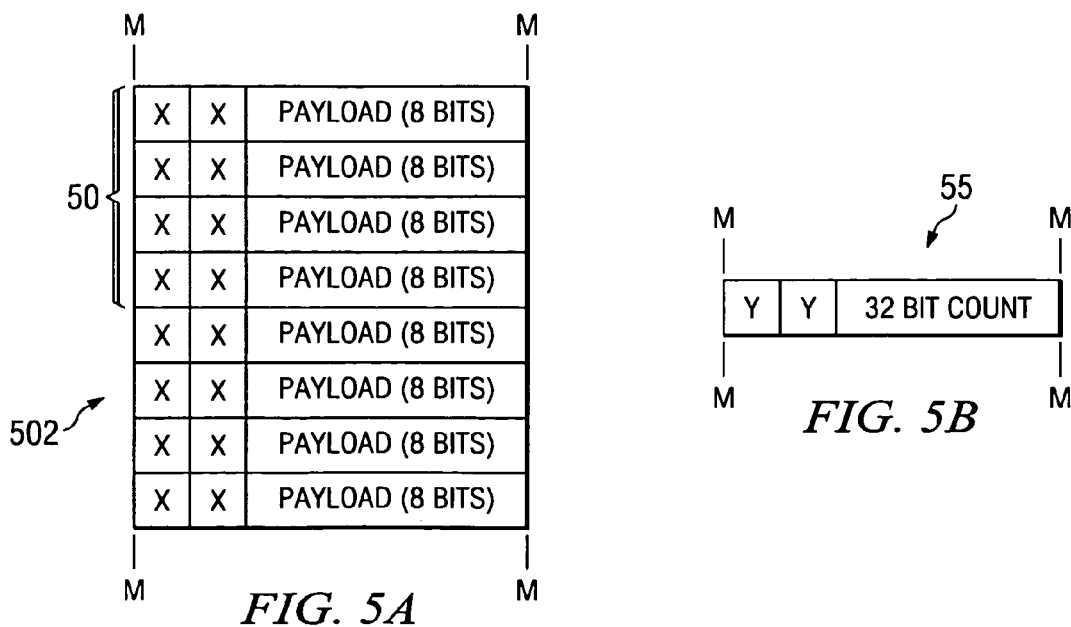
FIG. 5A
FIG. 5B

APPARATUS AND METHOD FOR COMPRESSION OF THE TIMING TRACE STREAM

This application claims priority under 35 USC §119(e)(1) of Provisional Application No. 60/434,176 filed Dec. 17, 2002.

RELATED APPLICATIONS

The following patent applications are related to this application:
10/728,627
10/729,212
10/729,239
10/729,650
10/729,591
10/729,407
10/729,564
10/729,400
10/729,592
10/729,639
10/729,214
10/729,327
10/729,647
10/729,401
10/729,326
10/729,190
10/729,191
10/729,272.

BACKGROUND OF THE INVENTION

1. Field of the Invention

This invention relates generally to the testing of digital signal processing units and, more particularly, to the signals that are transmitted from a target processor to a host processing unit to permit analysis of the target processor operation. Certain events in the target processor must be communicated to the host processing unit along with contextual information. In this manner, the test and debug data can be analyzed and problems in the operation of the target processor identified.

2. Description of the Related Art

As microprocessors and digital signal processors have become increasingly complex, advanced techniques have been developed to test these devices. Dedicated apparatus is available to implement the advanced techniques. Referring to FIG. 1, a general configuration for the test and debug of a target processor 12 is shown. The test and debug procedures operate under control of a host processing unit 10. The host processing unit 10 applies control signals to the emulation unit 11 and receives (test) data signals from the emulation unit 11 by cable connector 14. The emulation unit 11 applies control signals to and receives (test) signals from the target processing unit 12 by connector cable 15. The emulation unit 11 can be thought of as an interface unit between the host processing unit 10 and the target processor 12. The emulation unit 11 processes the control signals from the host processor unit 10 and applies these signals to the target processor 12 in such a manner that the target processor will respond with the appropriate test signals. The test signals from the target processor 12 can be a variety types. Two of the most popular test signal types are the JTAG (Joint Test Action Group) signals and trace signals. The JTAG protocol provides a standardized test procedure in wide use in which the status of selected components is determined in response to control signals from the host processing unit. Trace signals are signals from a multiplicity of selected locations in the target processor 12 during defined period of operation. While the width of the bus 15 interfacing to the host processing unit 10 generally has a standardized dimension, the bus between the emulation unit 11 and the target processor 12 can be increased to accommodate an increasing amount of data needed to verify the operation of the target processing unit 12. Part of the interface function between the host processing unit 10 and the target processor 12 is to store the test signals until the signals can be transmitted to the host processing unit 10.

In the prior art, the trace streams carry test and debug data from the target processor to the host processing unit in signal groups, the signal groups including signal packets. The trace packets are groups of data, a plurality of packets typically being transmitted together. The packets can be relatively small, e.g., each packet has an 8 bit payload (information signal group) in the preferred embodiment. The small size of the packets permits great flexibility in transmission through non-standardized interfaces. One of the trace streams is typically a timing trace stream. Each timing packet group typically includes a header packet and a plurality of information packets. The timing data identifies an activity or a non-activity of the program counter during each clock cycle. Therefore, a logic signal must be transmitted for each clock cycle of the target processing unit in order to reconstruct the activity of the target processor. Moreover, an appreciable part of the bandwidth of the trace streams can be used in transmission of the timing data. Because of the large amount of data that must be transmitted from the increasingly complex target processors to host processing unit for analysis, minimizing the transmission of data is important.

A need has been felt for apparatus and an associated method having the feature of reducing the amount of information that must be transmitted by the trace stream to the host processing unit. It would be another feature of the apparatus and associated method to reduce the amount of information used to represent the timing parameters of target processing unit. It would be yet another feature of the apparatus and associated method to provide flexibility in transmitting data in timing packet groups. It would a still another feature of the apparatus and associated method to provide timing packet groups capable of compressing the timing information of the target processor. It is a more particular feature of the apparatus and associated method to replace a timing packet group in which each data bit position represents the same logic signal with a smaller timing packet group.

SUMMARY OF THE INVENTION

The aforementioned and other features are accomplished, according to the present invention, by providing timing trace generation unit that has a first storage unit wherein a sequence of logic signals relating to the activity of the program counter associated with each clock cycle is formed into packet groups. The contents of the first storage unit are typically transferred to the host processing unit for analysis. A second storage unit includes a count of the number of bit positions for storing the logic signals of the first storage unit. A logic unit determines when all of the signals in the first storage unit have the same logic value. When this determination is made, an indicia of the same logic value is stored in a header portion of the second storage unit and the contents of the second storage unit are transmitted to the host processing unit in place of the contents of the first storage unit. Because the second storage unit is smaller than the first storage unit, a saving in the amount of transmitted information is achieved.

Other features and advantages of present invention will be more clearly understood upon reading of the following description and the accompanying drawings and the claims.

BRIEF DESCRIPTION OF THE DRAWINGS

FIG. 4A illustrates format by which the timing packets are assembled according to the present invention; while FIG. 4B illustrates how the packets in the timing trace stream are formed from the timing signals.

FIG. 5A illustrates a packet group in a typical timing trace stream, while FIG. 5B illustrates a compressed packet group according to the present invention.

DESCRIPTION OF THE PREFERRED EMBODIMENT

1. Detailed Description of the Figures

Figure 1:
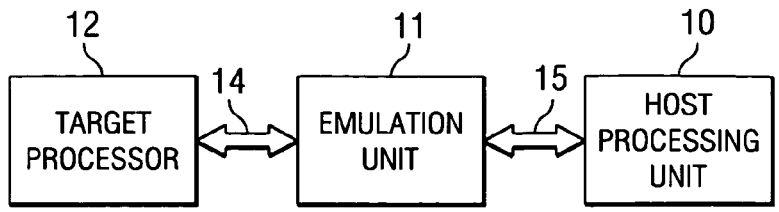
FIG. 1 is a general block diagram of a system configuration for test and debug of a target processor according to the prior art.

FIG. 1A and FIG. 1B have been described with respect to the related art.

Figure 2:
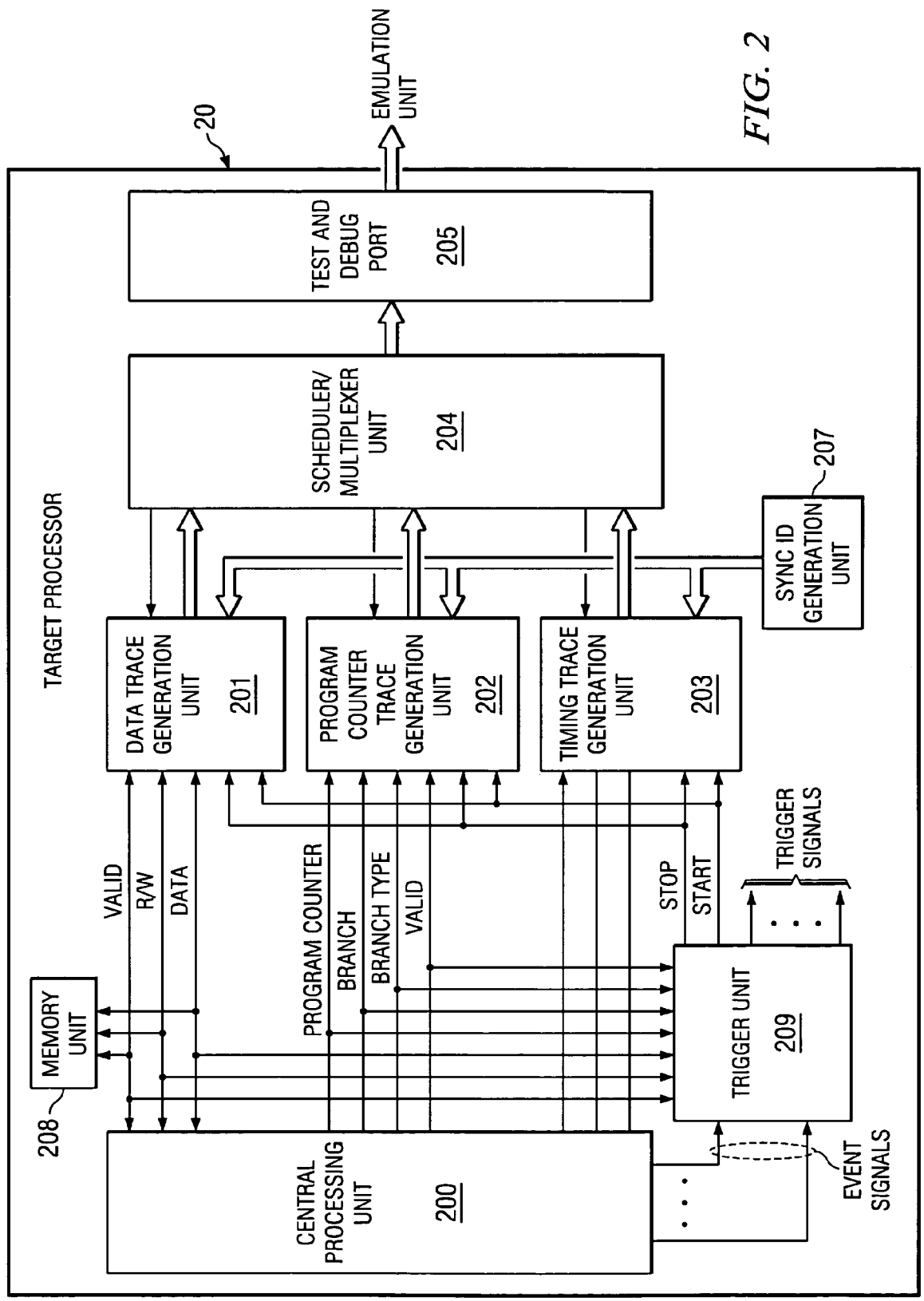
FIG. 2 is a block diagram of selected components in the target processor used the testing of the central processing unit of the target processor according to the present invention.

Referring to FIG. 2, a block diagram of selected components of a target processor 20, according to the present invention, is shown. The target processor includes at least one central processing unit 200 and a memory unit 208. The central processing unit 200 and the memory unit 208 are the components being tested. The trace system for testing the central processing unit 200 and the memory unit 202 includes three packet generating units, a data packet generation unit 201, a program counter packet generation unit 202 and a timing packet generation unit 203. The data packet generation unit 201 receives VALID signals, READ/WRITE signals and DATA signals from the central processing unit 200. After placing the signals in packets, the packets are applied to the scheduler/multiplexer unit 204 and forwarded to the test and debug port 205 for transfer to the emulation unit 11. The program counter packet generation unit 202 receives PROGRAM COUNTER signals, VALID signals, BRANCH signals, and BRANCH TYPE signals from the central processing unit 200 and, after forming these signal into packets, applies the resulting program counter packets to the scheduler/multiplexer 204 for transfer to the test and debug port 205. The timing packet generation unit 203 receives ADVANCE signals, VALID signals and CLOCK signals from the central processing unit 200 and, after forming these signal into packets, applies the resulting packets to the scheduler/multiplexer unit 204 and the scheduler/multiplexer 204 applies the packets to the test and debug port 205. Trigger unit 209 receives EVENT signals from the central processing unit 200 and signals that are applied to the data trace generation unit 201, the program counter trace generation unit 202, and the timing trace generation unit 203. The trigger unit 209 applies TRIGGER and CONTROL signals to the central processing unit 200 and applies CONTROL (i.e., STOP and START) signals to the data trace generation unit 201, the program counter generation unit 202, and the timing trace generation unit 203. The sync ID generation unit 207 applies signals to the data trace generation unit 201, the program counter trace generation unit 202 and the timing trace generation unit 203. While the test and debug apparatus components are shown as being separate from the central processing unit 201, it will be clear that an implementation these components can be integrated with the components of the central processing unit 201.

Figure 3:
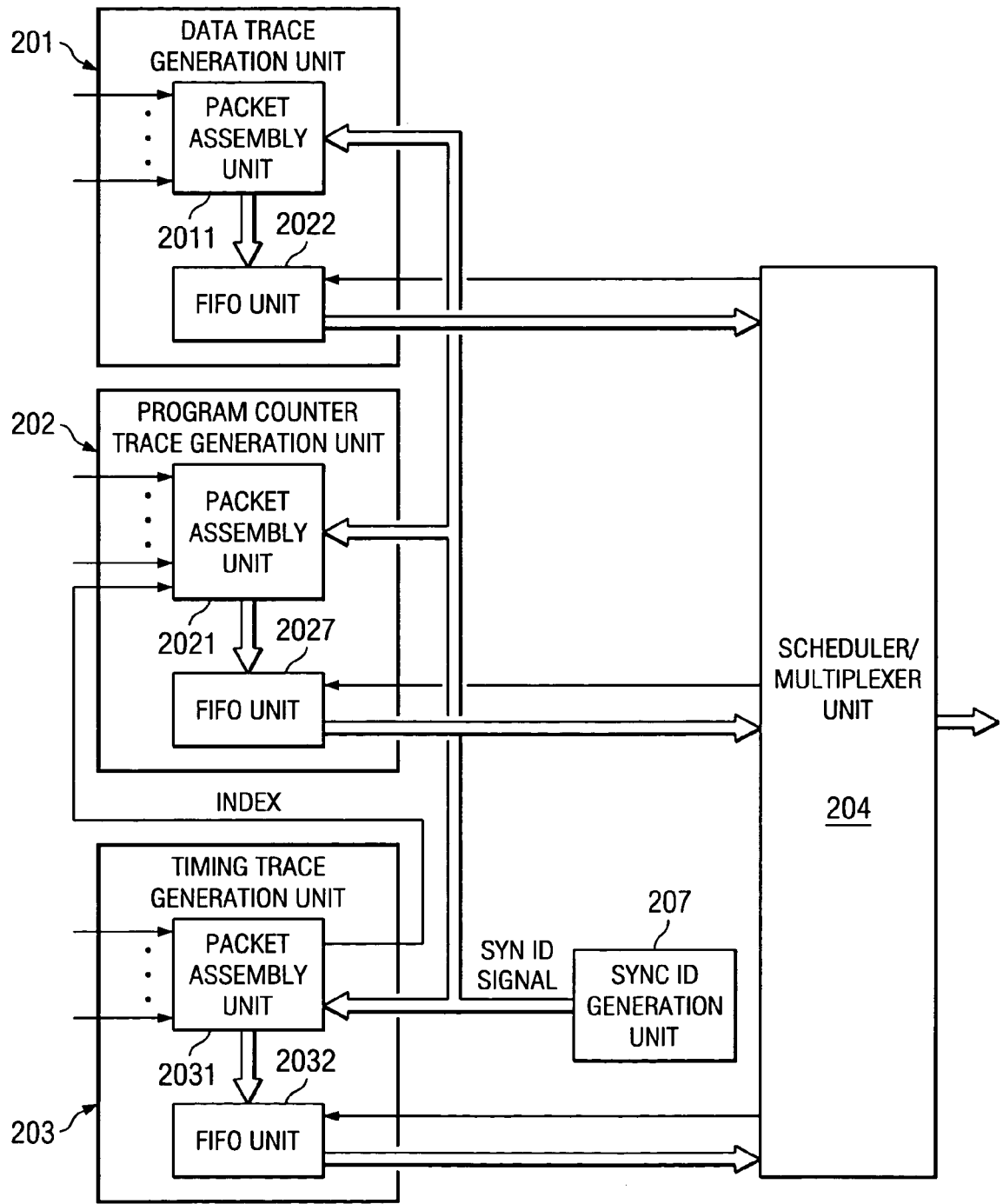
FIG. 3 is a block diagram of selected components of the illustrating the relationship between the components transmitting trace streams in the target processor.

Referring to FIG. 3, the relationship between selected components in the target processor 20 is illustrated. The data trace generation unit 201 includes a packet assembly unit 2011 and a FIFO (first in/first out) storage unit 2012, the program counter trace generation unit 202 includes a packet assembly unit 2021 and a FIFO storage unit 2022, and the timing trace generation unit 203 includes a packet generation unit 2031 and a FIFO storage unit 2032. As the signals are applied to the packet generators 201, 202, and 203, the signals are assembled into packets of information. The packets in the preferred embodiment are 10 bits in width. Packets are assembled in the packet assembly units in response to input signals and transferred to the associated FIFO unit. The scheduler/multiplexer 204 generates a signal to a selected trace generation unit and the contents of the associated FIFO storage unit are transferred to the scheduler/multiplexer 204 for transfer to the emulation unit. Also illustrated in FIG. 3 is the sync ID generation unit 207. The sync ID generation unit 207 applies an SYNC ID signal to the packet assembly unit of each trace generation unit. The periodic signal, a counter signal in the preferred embodiment, is included in a current packet and transferred to the associated FIFO unit. The packet resulting from the SYNC ID signal in each trace is transferred to the emulation unit and then to the host processing unit. In the host processing unit, the same count in each trace stream indicates that the point at which the trace streams are synchronized. In addition, the packet assembly unit 2031 of the timing trace generation unit 203 applies and INDEX signal to the packet assembly unit 2021 of the program counter trace generation unit 202. The function of the INDEX signal will be described below.

Referring to FIG. 4A, the assembly of timing packets is illustrated. The signals applied to the timing trace generation unit 203 are the CLOCK signals and the ADVANCE signals. The CLOCK signals are system clock signals to which the operation of the central processing unit 200 is synchronized. The ADVANCE signals indicate an activity such as a pipeline advance or program counter advance (( )) or a pipeline non-advance or program counter non-advance (1). An ADVANCE or NON-ADVANCE signal occurs each clock cycle. The timing packet is assembled so that the logic signal indicating ADVANCE or NON-ADVANCE is transmitted at the position of the concurrent CLOCK signal. These combined CLOCK/ADVANCE signals are divided into groups of 8 signals, assembled with two control bits in the packet assembly unit 2031, and transferred to the FIFO storage unit 2032.

Referring to FIG. 4B, the trace stream generated by the timing trace generation unit 203 is illustrated. The first (in time) trace packet is generated as before. During the assembly of the second trace packet, a SYNC ID signal is generated during the third clock cycle. In response, the timing packet assembly unit 2031 assembles a packet in response to the SYNC ID signal that includes the sync ID number. The next timing packet is only partially assembled at the time of the SYNC ID signal. In fact, the SYNC ID signal occurs during the third clock cycle of the formation of this timing packet. The timing packet assembly unit 2031 generates a TIMING INDEX 3 signal (for the third packet clock cycle at which the SYNC ID signal occurs) and transmits this TIMING INDEX 3 signal to the program counter packet assembly unit 2031.

Referring to FIG. 5A, a typical packet group 50 in the timing stream is illustrated. The packet group consists of four packets 502, each packet 502 having an 8 bit payload. In the preferred embodiment, an addressable memory location in the host processing unit stores 32 bits. The 2 bit control signals indicate that what is being transmitted in the timing trace stream is a series of 8 bit payload packets. As indicated above, the timing trace stream includes periodic sync markers that can synchronize the plurality of trace streams.

Referring to FIG. 5B, compressed packet group 55, according to the present invention, is shown. In this packet group 55, a 10 bit packet is transmitted. However, the control signals are selected to indicate that a different interpretation of the payload is required. In particular, the payload is an indication of the number of 32 bit timing packets, coincident with the memory location boundaries that transmit the same logic signal. If, for example, the packet group 50 included logic signals having the same value, then the packet group 50 is replaced by a packet 55. Several consecutive packets groups 50, in which the payload of each packet 502 has the same logic value, can be replaced by the packet 55. The packet 55 identifies the number of packet groups 50 having the same logic signal group in the packet payloads. In this manner, the timing trace stream can be compressed.

Figure 6:
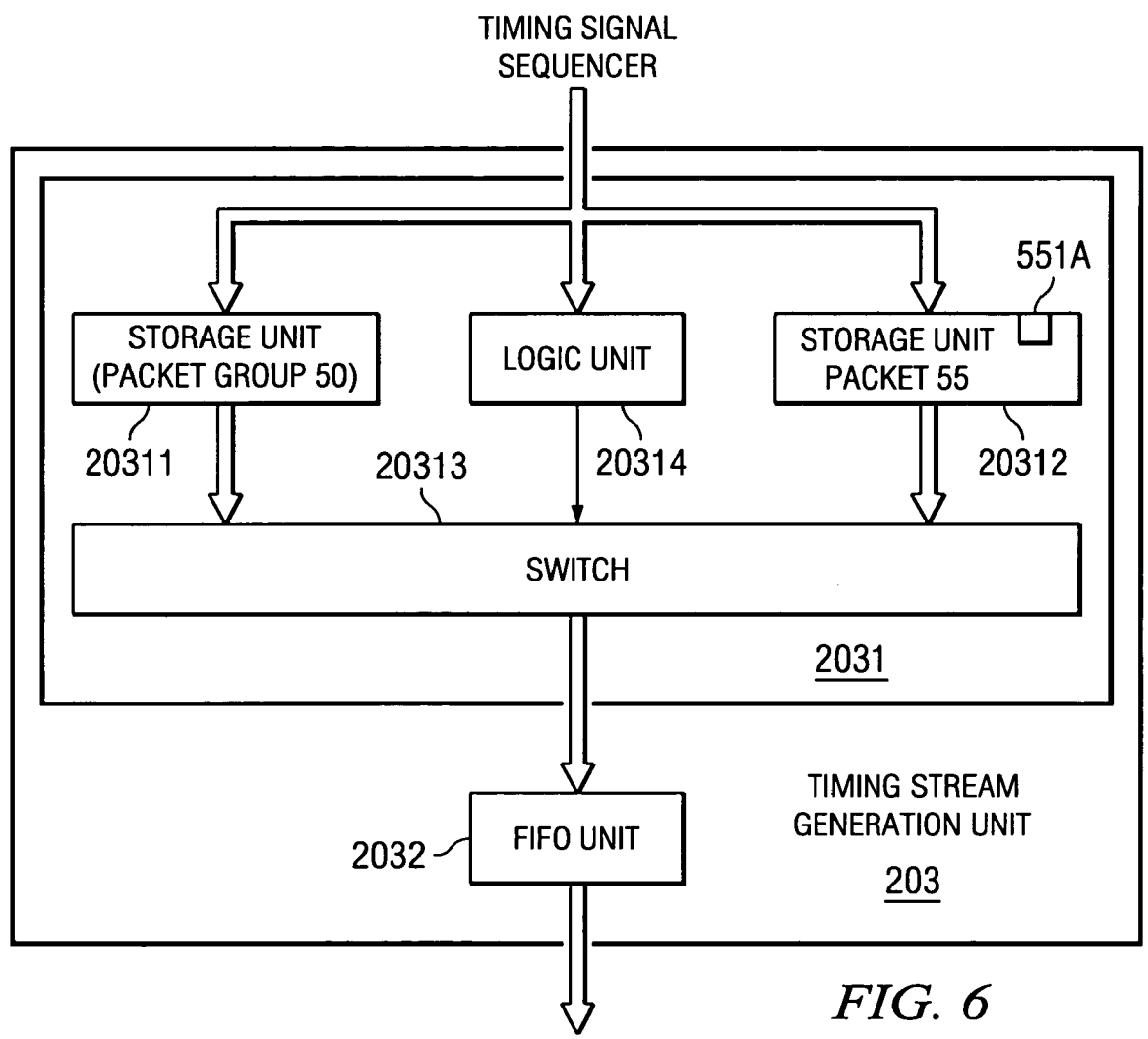
FIG. 6 is a block diagram for generating either a typical group of packets or a compressed group of packets according to the present invention.

Referring to FIG. 6, a block diagram of the timing stream generation unit 203 capable of performing the compression of the timing trace stream is shown. The packet assembly unit 2031 includes two storage units 20311 and 20312, a logic unit 20314, and a switch 20313. The timing sequence signals, a logic "1" or a logic "0" during each clock cycle is applied to storage unit 20311, to logic unit 30314, and to storage unit 20312. The timing sequence signals applied to storage unit 20311 fill the 32 bit (payload) positions in packet group 50. At the same time, the timing sequence signals are applied to the logic bit position 551A of the header packet 551 of the compressed packet group. In addition, the timing sequence signals are applied to the logic unit 20314. When the first bit position is filled in the storage unit, the logic unit begins to count the applied logic signals. When the first signal is entered in the storage unit 20311, the first count has been made in logic unit 20314. When the count in logic unit 20314 reaches 32, a control signal is applied to switch 20313. When all the logic signals of the timing sequence have the same value, a first control signal applied to the switch results in the contents of storage unit 20312 (i.e., packet group 55) being applied to the FIFO unit 2032. Because the timing sequence signals are applied to the header location 551A in storage unit 20312, when the packet group from storage unit 20312 is transferred to the FIFO unit, the logic signal in location 551A is the logic signal to which the 32 count of packet 55 refers. When the logic signals applied to logic unit 20314 have different logic states during the 32 clock cycles during which the storage unit 20311 is filled, a second logic signal from the logic unit 20314 applied to switch 20313 results in the contents of storage unit 20311 (i.e., packet group 50) being applied to the FIFO unit 2032.

2. Operation of the Preferred Embodiment

The present invention is directed toward minimizing the amount of data transferred from the target processor to the host processing unit while accurately reflecting the operation of the target processor. The present invention provides for the compression of the timing trace stream. This compression of the timing trace stream is the result of the recognition that many situations occur when a lengthy sequence of all logic "1"s or of all logic "0"s can occur. When the sequence of the same logic signals coincides with the a normal timing stream packet group as determined by the filling of the storage locations of the first storage unit in FIG. 6, a small packet group can be used to replace the typical normal timing stream trace group. The normal timing trace stream packet group has a predetermined payload (i.e., standard count of clock cycles) in each multi-packet group. This payload is selected to expedite storage of the logic signals in storage unit of the host processing unit.

As indicated in FIG. 5B, the standard count is included in information packet. A second packet is needed because it may expedite the testing of different target devices by storing a programming signal group in the information packet. In addition, the logic unit may be chosen to identify more than one standard count of clock cycles. In this embodiment, the logic device can identify the number of standard count of clock cycles and enter this number in information packet. In this embodiment, the compressed timing packet group is transferred to the FIFO unit when, after the first standard count of clock cycles is completed, a different logic value is identified.

When the standard count of clock cycles is non-changing, than the transmission of the header packet alone can provide the information concerning the single logic signal during the standard count of clock cycles. When the logic signal does not change for more than one standard count of clock cycles, then the number of standard clock cycles can be included in the information packet or in the header packet of the compressed timing group.

While the present timing trace stream has used the control signals to describe the function of the associated packet, the used packet groups with header could also be used to interpret the payload of the packet. The present invention provides a technique for compressing this timing trace stream format.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A method of compressing a timing trace stream which has a logic signal associated with each clock cycle of a target device, comprising:

determining that, during an instance of a preselected number of consecutive clock cycles, at least one logic signal at a first logic level and at least one logic signal at a second logic level are associated with respective ones of said clock cycles, and thereafter transmitting a first number of packets containing logic signals respectively associated with the preselected number of clock cycles; and determining that, during a further instance of said preselected number of consecutive clock cycles, the logic signals associated with the respective clock cycles all have a same logic level, and thereafter, instead of transmitting a corresponding said first number of packets, transmitting a compressed representation of the corresponding said first number of packets, wherein said compressed representation is formatted within a second number of said packets and contains an indication of said same logic level and an indication of said preselected number, and wherein said second number of packets is less than said first number of packets.

2. The method of claim 1, wherein one of said logic levels indicates activity of a program counter during the corresponding clock cycle, and the other of said logic levels indicates inactivity of the program counter during the corresponding clock cycle.

3. The method of claim 1, wherein said second number of packets is one.

4. An apparatus for generating a timing trace stream that is associated with a target processor and includes logic signals respectively associated with clock cycles of the target processor, comprising:

an input for receiving said logic signals;

logic coupled to said input for providing a first control signal when any two of a preselected consecutive number of said logic signals have respectively different logic levels, and further for providing a second control signal when all of said preselected consecutive number of logic signals have a same logic level;

a first storage portion coupled to said input for storing each of said preselected consecutive number of logic signals, said first storage portion coupled to said logic and responsive to said first control signal for transferring the stored logic signals formatted within a first number of packets; and a second storage portion coupled to said input for storing a first representation of said same logic level when all of said preselected consecutive number of logic signals have said same logic level, and said second storage portion further storing a second representation of a multiple of said preselected number, said second storage portion coupled to said logic and responsive to said second control signal for transferring said first and second representations formatted within a second number of said packets that is less than said first number of packets.

5. The apparatus of claim 4, wherein said second number of packets is one.

6. A system for transferring to a host processor information concerning the operation of a target processor, comprising:

a program counter trace stream generation unit configured to generate a trace stream that traces activity of a program counter in the target processor; and a timing trace stream generation unit having first and second modes of operation, said first mode of operation generating timing trace streams for transmission to the host processor, said timing trace streams having logic signals respectively associated with clock cycles of the target processor, wherein a first logic level of the logic signal indicates an activity associated with the program counter during the associated clock cycle and a second logic level of the logic signal indicates an absence of activity associated with the program counter during the associated clock cycle, said second mode of operation generating a compressed timing trace output for transmission to the host processor instead of one of said timing trace streams if said one timing trace stream would have contained only logic signals having a same logic level, said compressed timing trace output including a first representation of said same logic level and a second representation of a number of said logic signals that said one trace timing stream would have contained, and said compressed timing trace output requiring less transmission bandwidth than said one timing trace stream.

7. The system of claim 6, wherein said timing trace streams are each formatted within a plurality of packets, and said compressed timing trace output is formatted within a single said packet.

* * * * *